March 10, 1931.　　A. ROHRBACH　　1,795,970
WING OF AIRCRAFT
Filed April 2, 1927
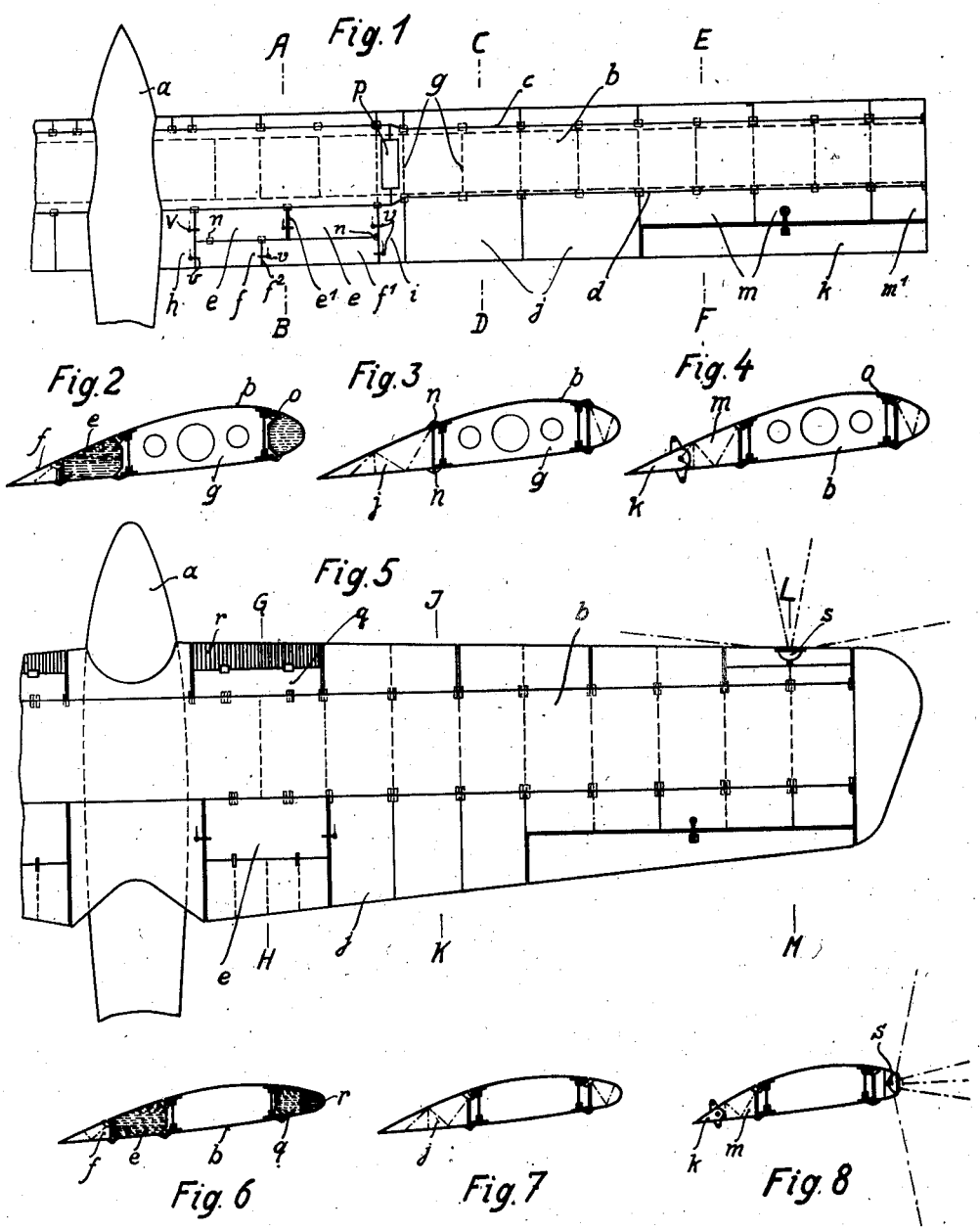

Patented Mar. 10, 1931

1,795,970

UNITED STATES PATENT OFFICE

ADOLF ROHRBACH, OF BERLIN-WILMERSDORF, GERMANY, ASSIGNOR TO ROHRBACH PATENTS CORPORATION, A CORPORATION OF DELAWARE

WING OF AIRCRAFT

Application filed April 2, 1927, Serial No. 180,384, and in Germany April 19, 1926.

The ever increasing development of metal aircraft construction calls for special consideration of the metal's inherent properties. It is a well known fact that aluminum alloys, specially favoured by modern aircraft constructors, will, to a certain extent, be impaired by the effects of corrosion, and particularly so in the case of seaplanes and flying-boats.

In order to efficiently protect the metal against such destructive influence, a special varnish is applied and a strict eye kept thereupon, so that reparations or replacements can be taken in hand in due time.

The roomy fuselage of the machine, which may be walked upon with perfect ease and safety, offers not the slightest difficulty to such methods of maintenance, nor do the detail parts of the remaining structure, providing that only easily accessible open sections or profiles are used. In contradistinction hereto the upkeep of the wing structure is a somewhat puzzling problem, inasmuch as the wings are of small height, cannot ordinarily be walked upon and, with their considerably tapered trailing edges, prevent easy access to their interior.

The absolutely necessary most careful inspection of every point of the structure, can, however, not be obtained by a proposed design, characterized by the wing being subdivided into a number of boxes arranged in a line in the direction of flight, said boxes forming girders of equal bending strength and transmitting their part of the total stress either to the wing-base or the fuselage proper. In order to prevent unequal bending of the individual boxes, a screw or rivet joint must be provided between them so as to be not easily severed. The complete dismounting of the individual much projecting boxes would offer great difficulty, and every one of them is so small, that detaching one would not suffice to ensure accessibility of the remaining. This means that in case of close examination and overhauling of the entire wing interior, the whole wing would have to be detached and dismantled.

The following form of wing construction very effectively avoids the above described drawbacks: central supporting girder providing detachable or hingeable leading or trailing edges, said edges being subdivided into independent units occupying only part of the wing length. Turning up or down of said parts or units will lay open a section of the wing-edge of sufficient size to allow of easy working within the now accessible portion of the inner wing structure.

The accessibility of the edge-parts, however, is in general all that can be desired, the interior structure being open towards three sides with one unit turned down, towards two sides with one unit remaining independent and in position. In practice overhauling is effected by the workman turning back the edge portion to be supported by the top or bottom side of the main girder, but he can reach all interior parts of the edge part member so turned back only when its length in the fore and aft direction is not greater than the length of an arm.

There are types in which edge parts of larger dimensions in the said sense are provided. The present invention tends to facilitate the workman's task by subdividing one or more of the said edge-parts in the direction of flight in order to obtain structural units of smaller depth. This design proves of special advantage with regard to the tapered trailing edge, in as much as its interior shall thereby be made accessible enough, to allow of working at the angles and small sections without any difficulty.

When examined from the standpoint of practical construction this new design will turn out well, allowing to produce the tapered edge-pieces with their compact structure as independent units, special consideration being paid to their constructional properties, and arranging them so as to be detachable from the parts at the main girder, which, being more roomy, are separately built with a resulting saving of time and expense.

Another useful feature of the present invention is that it can be made to serve for the accommodation of loads, within the wing proper. The liquid fuel for instance, has been so far carried either in the main wing portion or in one of the hinged leading edge parts, whereas the trailing edge boxes could not be used for the said purpose because of their small structural height and tapered form. It is, however, most desirable to arrange part of the load on hand aft of the wing girder, in order to avoid the tendency to nose heaviness, a tendency specially shown by machines with power plant arranged in front.

In this connection the invention presents a most convenient solution, allowing, by division of the trailing edge parts into two independent units, to design the more roomy, somewhat box-shaped front-piece as a fuel-tank, to which the rear piece is attached in the usual way, forming the extreme trailing edge part.

The invention can further be used in connection with the twisting of the wing. The method is put into practice by using, instead of a large aileron directly hinged to the wing main girder, a small control member of better streamline properties, to be indirectly joined to the main girder by inserting detachable edge pieces. This arrangement results in another saving of time and expense, as the unequally sized edge-pieces can be separately manufactured.

In certain cases it will be desirable to confine the sub-division according to the present invention to the edge pieces at the wing base and wing tip and to leave the intermediate edge-pieces as independent units, either rigidly or detachably connected with the main girder.

The invention can be applied to the leading edge parts as well, sub-dividing them and making use of the different parts for various ends. It is, for instance, possible to design the part adjacent to the wing as fuel-tank and the other part as radiator for the power plant. It seems rather improbable that the wing-tip parts should be used to accommodate fuel tanks; here instruments, apparatus and so on could be stowed away in the edge pieces arranged separately of the main girder. It is of course possible, according to the invention, to use the trailing part of the sub-divided rear edge for some special purposes.

The accompanying drawings show, by way of example, several embodiments of the present invention. Figs. 1 and 5 represent plan-views of two different wings, the construction of which is set forth more particularly in sectional views Figs. 2–4 and 6–8 along the lines A—B, C—D, E—F, G—H, J—K, L—M.

Referring to these drawings the aircraft wing consists of a hollow box girder $b$, either directly joined to the fuselage $a$ or uninterruptedly connected with an opposite wing, short edge-pieces being arranged in wing span direction at the leading and trailing edges $c$, $d$, of said hollow box girder in a detachable or hingeable manner and transmitting their part of the air forces to the girder $b$. A certain number of those edge pieces being sub-divided in the direction of flight, and forming part sections of the respective edge.

Figs. 1 and 2 show the part sections $e$, $e$ of the trailing edge of the wing designed as oblong fuel tanks, to be attached to the girder $b$ and supporting the parts $f$, $f^1$ which impart the final shape to the wing. By reasons of standardization those latter sections $f$, $f^1$ are unequal in length, their total length corresponding to the combined lengths of the tanks $e$. By relatively shifting or staggering the dividing-joints $e^1$, $f^2$ a certain additional stiffness of the whole edge-structure $e$, $e$, $f$, $f^1$ is attained, as for example so that as indicated the edge part $f'$ projects beyond the joint $e'$ and is attached to both the parts $e$, $e$. The several parts are connected to each other in the fore and aft direction by the connecting parts $n$ which may be hinges or other suitable detachable connections. The rigidity may be still further increased by connecting the members $e$, $e$, $f$, $f'$ to each other in wing span direction by the detachably connected cross pieces $v$ which bridge the separating joints $e'$, $f'$. These connections $v$ may be of any suitable character, as for example turnable scarfs or pivotal latch members bridging the joints. Preferably similar connections $v$ are also provided between the part $h$ and $e$, $f$ and between $i$ and $e$, $f'$.

$h$, $i$, $j$ are one-pieced edge-parts of unequal length, arranged in wing-span direction, and extending from the rear longitudinal edge $d$ to the trailing edge of the wing. The parts are arranged so as to be detachable, as shown in the accompanying drawing. It is, of course, possible to make them in one piece with the girder $b$, which arrangement could be adopted, if their extension in wing span direction is but rather small. If it seems preferable the edge-pieces $e$—$e$, $f$—$f$ could be attached to the said parts.

Near the wing tip the invention is applied in such manner, that between the wing girder $b$ and the aileron $k$ small edge-pieces $m$, $m^1$ are inserted, which, being attached to the girder, are meant to support the aileron. In general practice the intermediate members $m$, $m^1$, the lengths of which correspond to the division of the transverse walls, are designed as open sections; it is however, desirable some times to have then form closed reservoirs, which, for instance, could be used as floating bodies in case of emergency.

Simple hinges $n$ (Fig. 3) may be used as connecting members for the girder $b$ and the sub-divided and solid edge-pieces, if it seems desirable to turn the edge-pieces or their part sections up and down on their hinges. If one is satisfied with simply pulling down the edge-pieces or their part-sections, it would be suitable to partly replace the outer hinges $n$ by inner slip-in-joints $o$ (Figs. 2, 4).

The wing according to Fig. 1 is of rectangular section and provides a dividing-joint at p, in the girder b. In contradistinction hereto Fig. 5 shows a wing tapered off towards its tip with undivided continuous girder. Arrangement and design of trailing edge pieces are, in the latter case, similar to those represented in Fig. 1.

According to the present invention the leading edge parts can be sub-divided in the same manner as the trailing edge parts. Said arrangement being recommendable, if some edge-piece shall accommodate, in addition to the fuel tank q, a circulation radiator r for the power plant (Figs. 5, 6). It may also be desirable, to arrange, within the end-piece of an edge section special instruments or apparatus, a search-light s, for instance. All the above cases represent the advantage, that the part-sections with their different structure can be manufactured either in particular departments of the work-shop or obtained as independent and separate parts.

It does not bear upon the nature of the present invention, whether the wing be of cantilever type or braced against the fuselage, and whether the above indicated alloys be used as building material or not. The wing may be sub-divided into two or more parts, in the direction of flight, according to circumstances.

What I claim is:

1. An aircraft wing including a girder structure which extends in the direction of the wing span and serves as the main wing base, fixed edge parts attached to the fore and aft edges of the wing girder to complete the wing section, and directly supported by the wing girder proper, said edge parts being of relatively short length in the direction of the wing span and being separately attachable to and detachable from the wing girder transversely to the direction of the wing span to which girder they transmit their forces, at least one of said edge parts being sub-divided in the direction of flight of the trailing edge into parts located one behind the other and at least the outside sub-divided part having an interior accessible from its plane of connection.

2. An aircraft wing of the character set forth in claim 1 in which the portion of the sub-divided edge part adjacent to the wing girder serves as a support for the other corresponding sub-divided part thereof, said other part being detachably joined or hinged with its supporting body.

3. An aircraft wing embodying a girder structure which extends in the direction of the wing span and serves as the main supporting base for the wing, special metal fore and aft edge parts directly carried by said girder structure adjacent the wing root and the tip thereof and adapted to complete the fixed profile of the supporting surface, said special edge parts being of relatively short length in the longitudinal direction of the wing and being individually detachably or hingedly connected to the girder transversely to the direction of the wing span, the connection being adapted to transmit the air forces upon the edge parts to the main girder, certain of the edge parts being also sub-divided in the fore and aft direction into individual parts located one behind the other in the direction of flight, the individual part of each sub-divided edge part adjacent to the girder serving as a supporting body for the other individual portion or portions, said latter having their interiors accessible from the connection planes and being detachably or hingedly connected with the supporting body.

4. An aircraft wing embodying a girder structure which extends in the direction of the wing span and serves as the main wing supporting base, said wing including special edge parts carried by the main girder for completing the profile of the supporting surface, said edge parts being relatively short in the direction of the wing span and being separately detachable or hinged to the main wing girder so that the forces thereupon are transmitted to the girder, adjacent edge parts being sub-divided in a fore and aft direction into individual parts located one behind the other in the direction of flight, the individual parts adjacent the main wing girder differing in length in the direction of the wing span from the adjacent sub-divided parts, the latter being supported by the former.

5. An aircraft wing comprising a girder structure extending in the direction of the wing span and serving as a main wing supporting base, at least aft edge parts directly carried by the girder and serving to complete the fixed profile of the supporting surface, said edge parts being of metal and of comparatively short length in the direction of the wing span, certain of these edge parts being formed as special detachable members supported by the main wing girder, and at least one of said aft edge parts comprising individual parts located one behind the other in the direction of flight, one of these parts which is detachably or hingedly joined to and supported by the main wing girder being formed as a fuel tank and supporting the other sub-divided part, said latter having its interior accessible from its plane of connection.

6. An aircraft wing of the character set forth in claim 4 wherein the fore and aft subdivided edge part which is joined to the main wing girder is provided with partition walls forming the walls of a fuel tank.

7. An aircraft wing comprising a girder structure extending in the direction of the wing span and serving as the main wing supporting base, readily attachable and detachable edge parts carried by said wing girder and completing the profile of the supporting surface, said edge parts being of comparatively short length in the direction of the wing span, certain of said parts being carried at the trailing edge of the girder tip, said latter edge parts being detachably connected or hinged to the main wing girder, and a number of them serving together as the support for an aileron formed in one piece.

8. An aircraft wing according to claim 7 wherein the edge parts supporting the aileron are formed as floatable bodies.

9. An aircraft wing of the character set forth in claim 1 wherein the subdivided part carried by the part adjacent the main wing girder is adapted to accommodate utensils, instruments and other accessories, and is provided with a covering, by which latter the effect of the accessories is rendered outwards.

10. An aircraft wing of the character set forth in claim 1 wherein the subdivided part part which is carried by the part adjacent the main wing girder is formed to accommodate independently utensils, instruments and other accessory apparatus and is detachable connected or hinged to the supporting subdivided part, said accommodating body having a covering which makes it possible to render outwards the effect of the accessories.

11. An aircraft wing comprising a main central box-like girder serving as the main wing supporting base, fore and aft trailing and leading edge parts carried by the girder and completing the profile of these supporting surfaces, said edge parts being detachably joined or hinged to the girder and being sub-divided into short lengths in the direction of wing span, at least one of the front edge parts being formed as a fuel tank, one of the rear edge parts being sub-divided in a fore and aft direction into two parts located one behind the other in the direction of flight, the sub-divided part adjacent the main wing girder being formed as a fuel tank and serving as a support for the other sub-divided part, the rear edge parts adjacent the wing tip being of comparatively short length in the direction of flight, said parts together supporting an aileron which forms its rear terminal part.

12. An aircraft wing comprising a main central metal girder of box-like form, said central part including transverse walls arranged at intervals in the direction of the wings span, metal edge parts carried by said girder on one edge thereof, said edge parts being detachably joined or hinged to the girder and being of comparatively short length in the direction of the wing span, their end surfaces being flush with the cross walls of the girder, at least one of these edge parts being sub-divided in a fore and aft direction into individual parts located one behind the other in the direction of flight, the sub-divided part which is adjacent the girder carrying the other, this latter being detachably or hingedly joined to the former, the sub-divided part adjacent the girder being provided with a wall or walls at the connection-planes, said walls making it liquid-proof.

13. An aircraft wing of the character set forth in claim 2, wherein the wing main girder from its base to its tip is formed as a substantially straight uninterrupted central wing portion, its full section being completed by the fore and aft edges, the wing edge part between the root and the tip being also of metal and sub-divided into small edge parts which are separately detachably or hingedly attached to the main girder, to which they transmit their forces, the said small edge parts having their interior accessible from the connecting planes.

14. An aircraft wing comprising a main central box-like girder serving as the main wing supporting base, fore and aft trailing and leading metal edge parts carried by the girder and completing the profile of the supporting surfaces, said edge parts being detachably joined or hinged to the girder and being sub-divided into short lengths in the direction of wing span, at least one of the front edge parts being formed as a fuel tank said tank being situated laterally of the fuselage at the wing root, one of the rear edge parts situated at the wing root and laterally of the fuselage being sub-divided in the fore and aft direction into two portions located one behind the other in the direction of flight, the sub-divided part adjacent the main wing girder being formed as a fuel tank and serving as a support for the other sub-divided part.

15. An aircraft wing of the character set forth in claim 4, wherein the members of the sub-divided edge parts situated at a distance from the wing main girder have their interior accessible from the connection planes, and are detachably or hingedly joined to their supporting body.

16. An aircraft wing of the character set forth in claim 4, wherein the edge parts sub-divided in the fore and aft direction into individual parts are situated between edge portions not farther sub-divided in the direction of flight, means at the edge parts for connecting or adjusting, adapted to reinforce the individual parts, holding their top and bottom surfaces in the wing surface.

17. Aircraft having a fuselage, metal wings extending laterally of the vertical fuselage projection, each wing comprising a box-shaped girder lying in the direction of the wing span and serving as wing main member, readily attachable and detachable edge parts which are directly supported by the said wing girder and complete the fixed section of the supporting surface, said edge parts being of relatively short length in the direction of the wing span, certain of the aft edge parts situated laterally of the fuselage comprising special parts following after one another in the direction of flight, at least one special part being located at the wing root laterally of the fuselage and adjacent to the wing main girder and detachably or hingedly joined to the latter and forming a fuel tank the other corresponding special part having its interior accessible at the connection planes and being supported by the first-mentioned special part.

18. An aircraft of the character set forth in claim 17, wherein the box-shaped main girder is provided with readily attachable or hinged leading and trailing edge portions of relatively short length in the direction of the wing span, certain of such leading edge parts situated at the wing root laterally of the fuselage being provided with walls forming fuel tanks.

19. A structure of the character set forth comprising edge parts adapted to be attached to one edge of an aircraft wing forming the base of an aircraft wing, in order to complete the fixed wing section, and including at least two hollow liquid-proof members located side by side in the wing span direction and directly and readily detachably or hingedly joined with the wing girder and supported by the latter, said hollow members supporting, at their side remote from the girder individual edge parts, the latter being detachably or hingedly connected with the hollow members, said hollow members in the direction of the wing span being of a different length than the liquid-proof hollow members and having their interior accessible from the connection planes.

20. An aircraft having a fuselage and metal wings, each wing comprising a hollow box-shaped girder extending in the direction of the wing span and serving as the wing base, readily attachable and detachable leading and trailing edge parts directly supported by said wing girder and completing the wing section, said edge portions forming in the direction of the wing span relatively short part members arranged side by side over the entire length of the wing, certain edge parts situated at the wing root laterally of the fuselage and near the wing tip comprising special parts following one after another in the direction of flight, several of the special parts adjacent to the girder near the wing tip carrying an aileron, at least one special part situated at the wing root and adjacent to the girder being formed as fuel tank and carrying another special part which is readily detachably or hingedly connected with the first mentioned special part, at least one of the leading edge parts located at the wing root laterally of the fuselage being likewise formed as a fuel tank.

In testimony whereof, I have signed my name to this specification.

ADOLF ROHRBACH.

CERTIFICATE OF CORRECTION.

Patent No. 1,795,970. Granted March 10, 1931, to

ADOLF ROHRBACH.

It is hereby certified that error appears in the printed specification of the above numbered patent requiring correction as follows: Page 3, line 45, claim 1, after the word "parts" insert the words of the trailing edge, and line 47, strike out the words "of the trailing edge"; and that the said Letters Patent should be read with these corrections therein that the same may conform to the record of the case in the Patent Office.

Signed and sealed this 31st day of March, A. D. 1931.

(Seal)

M. J. Moore,
Acting Commissioner of Patents.